United States Patent [19]
Ledon

[11] Patent Number: 5,827,493
[45] Date of Patent: Oct. 27, 1998

[54] PROCESS FOR PRODUCING HYDROGEN PEROXIDE

[75] Inventor: Henry Ledon, Versailles, France

[73] Assignee: Chemoxal S.A., Paris Cedex, France

[21] Appl. No.: 727,642

[22] PCT Filed: Jan. 30, 1996

[86] PCT No.: PCT/FR96/00158

§ 371 Date: Oct. 15, 1996

§ 102(e) Date: Oct. 15, 1996

[87] PCT Pub. No.: WO96/26896

PCT Pub. Date: Sep. 6, 1996

[30] Foreign Application Priority Data

Feb. 28, 1995 [FR] France ................................ 95 02316

[51] Int. Cl.⁶ .............................................. C01B 15/023
[52] U.S. Cl. ...................... 423/588; 422/211; 423/589; 423/590
[58] Field of Search ..................... 423/588, 589, 423/590

[56] References Cited

U.S. PATENT DOCUMENTS

| | | | |
|---|---|---|---|
| 2,902,347 | 9/1959 | Cosby et al. | 423/590 |
| 2,995,424 | 8/1961 | Farrell | 423/590 |
| 3,880,596 | 4/1975 | Liebert et al. | |
| 3,952,089 | 4/1976 | Käbisch et al. | 423/588 |
| 4,485,084 | 11/1984 | McIntyre | 423/588 |
| 4,526,757 | 7/1985 | Gupta | 423/659 |
| 4,539,196 | 9/1985 | Sethl et al. | 423/588 |
| 4,541,997 | 9/1985 | Bengt | 423/588 |
| 4,606,905 | 8/1986 | Thirion | 423/588 |

FOREIGN PATENT DOCUMENTS

| | | | |
|---|---|---|---|
| 585331 | 10/1959 | Canada | 423/588 |
| 592287 | 2/1960 | Canada | 423/588 |

*Primary Examiner*—Wayne Langel
*Attorney, Agent, or Firm*—Young & Thompson

[57] ABSTRACT

A method using auto-oxidation of an anthraquinone derivative in three successive steps, comprising hydrogenating the working solution (at 1), oxidizing the hydrogenated working solution (at 2), and removing hydrogen peroxide using water (at 3). The hydrogenation step is performed in such a way that a hydrogen peroxide equivalent of around 7.9 g/l is achieved at the inlet of the oxidizer (2), and the oxidation step (b) is performed in such a way that the temperature at the top of the oxidizer (2) is below about 50° C., and preferably around 35°–40° C. The method is useful for producing hydrogen peroxide in situ in a paper pulp bleaching plant.

8 Claims, 2 Drawing Sheets

PROCESS FOR PRODUCING HYDROGEN PEROXIDE

FIELD OF THE INVENTION

The present invention relates to a process for producing hydrogen peroxide according to the technique of autooxidation of an anthraquinone derivative, of the type including:

a stage (a) of catalytic hydrogenation, in a hydrogenator, of a working solution containing at least one anthraquinone derivative in solution in at least one organic solvent;

after filtration of the hydrogenated working solution, a stage (b) of oxidation, in an oxidizer, of this hydrogenated working solution, by means of a fluid containing oxygen, especially by means of air;

a stage (c) of separation, using water, in an extractor, of the hydrogen peroxide and of the oxidized working solution; and a stage (d) of recycling to the hydrogenator of the oxidized working solution is recovered in stage (c).

In what follows, the pressures shown are relative pressures (or overpressures).

BACKGROUND OF THE INVENTION

A process as described above is conventionally carried out in plants intended for the production of commercial hydrogen peroxide solutions. For economic reasons (cf. Process Economic Report No. 68B, Hydrogen Peroxide, Marc 1992, chapter VI, SRI International) essentially linked with transportation and storage costs, these solutions must have a hydrogen peroxide concentration which is as high as possible, that is a concentration higher than 35%, more generally a concentration of 60% or 70% by weight.

With a view to preparing these concentrated, commercial hydrogen peroxide solutions the procedure is such as to recover at the exit of the extractor (stage (c)) a solution which has a hydrogen peroxide concentration that is as high as possible, while remaining outside the explosiveness region of the mixtures of working solutions and aqueous hydrogen peroxide solutions. In this context, patent application FR-A-2 228 717 shows that the hydrogen peroxide concentration of the said aqueous solution leaving the extractor must not be higher than 600 g/l, that is 50% by weight of hydrogen peroxide. A hydrogen peroxide concentration higher than this value is described as being capable of causing explosive reactions.

To obtain highly concentrated aqueous hydrogen peroxide solutions the operational parameters of the abovementioned autooxidation process are adapted so as to permit the use of a working solution which has a hydrogen peroxide equivalent that is as high as possible, for example a hydrogen peroxide equivalent higher than 11 g/l, or even more. Thus, patent application FR-A-2 086 166 recommends the use of a working solution capable of producing, after oxidation, a quantity of hydrogen peroxide of the order of 16 g/liter of working solution. However, such a conventional process using a high hydrogen peroxide equivalent has numerous disadvantages. Thus, this conventional process generally requires the use of high hydrogenation (stage (a)) and oxidation (stage (b)) temperatures. In this context, reference may be made to "Techniques de l'Ingénieur, chapitre "Peroxyde d'hydrogène" ["Techniques for the Technologist, "Hydrogen peroxide" chapter], J 6 020, which mentions that the hydrogenation and oxidation temperatures must be between 60° and 80° C.

Another disadvantage encountered by the use of the said conventional process is that the working solution is rapidly degraded.

In addition, this conventional process is very sensitive to the presence of water, even in small quantity, which can be introduced accidentally either into the oxidizer or into the lines connecting the oxidizer and the extractor. In this region water reacts with the oxidized working solution, and this can cause explosive reactions.

OBJECT OF THE INVENTION

The objective of the present invention is to forestall the abovementioned disadvantages.

More particularly the objective of the invention is to provide a process for producing hydrogen peroxide according to the autooxidation technique including the stages (a) to (d) described above, which is particularly well suited from the viewpoint of the investment, of the operating cost and of safety, in real industrial conditions, to the on-site production of hydrogen peroxide that can be employed directly in some consumer plants such as the plants for the manufacture of paper pulp.

SUMMARY OF THE INVENTION

To this end the subject of the invention is a process of the above-mentioned type, characterized in that:

the hydrogenation stage (a) is conducted so as to obtain at the entry of the oxidizer a hydrogen peroxide equivalent of approximately between 7 and 9 g/l; and the oxidation stage (b) is conducted at a temperature which, at the top of the oxidizer, is lower than approximately 50° C. and preferably approximately between 35° and 40° C.

This process may comprise one or more of the following characteristics:

the oxidation stage (b) is conducted at a pressure, in the top gas space of the oxidizer, of approximately between 1 and 10 bars, preferably approximately between 2 and 4 bars, the hydrogenation stage (a) is conducted at a temperature of approximately between 50° and 70° C., the hydrogenation stage (a) is conducted at a pressure, in the top gas space of the hydrogenator, of approximately between 0.5 and 4 bars, preferably approximately between 0.8 and 1.5 bars, means for gas-liquid contact which consist at least partly of an organized packing, especially of a corrugated-crisscross packing, are employed in the oxidizer, means for gas-liquid contact which consist at least partly of trays similar to distillation trays are employed in the oxidizer, a solution of hydrogen peroxide in water at a hydrogen peroxide concentration lower than 15% by weight and preferably between 5 and 12% by weight is produced by stage (c);

the oxidation stage is performed counter-currentwise.

Another subject of the invention is a plant intended for carrying out the process defined above.

According to a first embodiment this plant, of the type including a catalytic hydrogenator fed with hydrogen, an oxidizer fed with a fluid containing oxygen, especially air, an extractor fed with water, and including means for passing a working solution, containing at least one anthraquinone derivative in solution in at least one organic solvent, successively into the hydrogenator, into the oxidizer and into the extractor, and then recycling it to the hydrogenator, is characterized in that the oxidizer includes a casing containing means for gas-liquid contact which consist at least partly of an organized packing, especially of a corrugated-crisscross packing.

According to a second embodiment the plant, of the type including a catalytic hydrogenator fed with hydrogen, an oxidizer fed with a fluid containing oxygen, especially air, an extractor fed with water, and including means for passing a working solution, containing at least one anthraquinone derivative in solution in at least one organic solvent, successively into the hydrogenator into the oxidizer and into the extractor and then recycling it to the hydrogenator, is characterized in that the oxidizer includes a casing containing means for gas-liquid contact which consist at least partly of simple perforated trays or trays similar to distillation trays.

BRIEF DESCRIPTION OF THE DRAWINGS

Examples of embodiment of the invention will now be described with regard to the attached drawings in which.

DETAILED DESCRIPTION OF THE INVENTION

Figure 1:
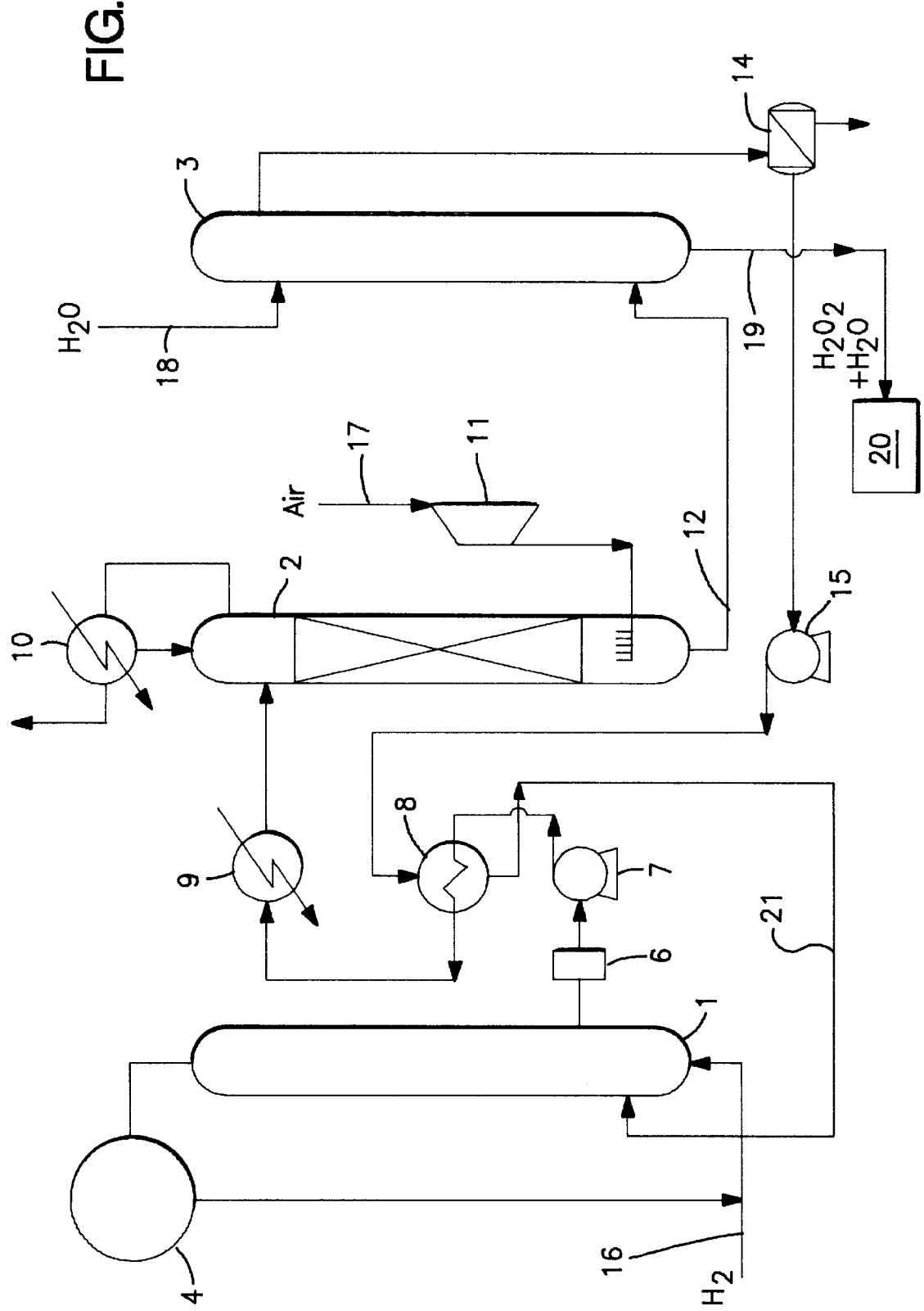
FIG. 1 shows diagrammatically a plant for producing hydrogen peroxide in accordance with the invention.

The plant shown in FIG. 1 includes three main units of equipment in the form of columns: a catalytic hydrogenator 1, a countercurrent oxidizer 2 and a water extractor 3. It also comprises numerous pieces of equipment associated with these three units, only some of which have been shown: an overpressurizer- condenser unit 4 for recirculating the gaseous mixture containing hydrogen, associated with the hydrogenator, a filter 6, a pump 7, a heat exchanger 8, a water cooler 9, a head condenser 10 and an air compressor 11 which are associated with the oxidizer, a line 12, as short as possible, connecting the base of the oxidizer 2 to that of the extractor 3, and a coalescer 14 and a pump 15 for recycling the working solution.

Also shown in FIG. 1 are a line 16 for feeding the hydrogenator with make-up hydrogen, a line 17 for feeding air to the compressor 11, a line 18 for feeding the extractor 13 with demineralized water, a hydrogen peroxide output line 19 which leaves from the base of the extractor 3 and ends at a plant 20 consuming hydrogen peroxide at the same concentration, and a line 21 for recycling the working solution.

The plant 20, which is situated on the same site as the plant for producing hydrogen peroxide, may in particular be a plant for bleaching paper pulp.

The plant for producing hydrogen peroxide includes many other pieces of equipment which are well known in the technology and are not shown, such as means for regenerating graded products of the working solution, for making use of the catalyst, for solvent recovery, and the like.

In operation, the working solution consisting of at least one anthraquinone derivative and of at least one organic solvent is introduced at the base of the hydrogenator 1 via the recycling line 21 connected to the delivery of the pump 15 and a gas stream containing hydrogen is also introduced at the base of the hydrogenator. This gas stream consists, on the one hand, of the gas stream drawn off at the top of the hydrogenator and recycled by the overpressurizer-condenser unit 4 and, on the other hand, of make-up hydrogen delivered via the line 16.

The working solution is thus partly reduced. The reduced solution drawn off from the base of the hydrogenator by the pump 7 via the filter 6 therefore contains hydroquinone derivatives (for example 80% of tetrahydroanthrahydroquinone and 20% of anthrahydroquinone).

The anthraquinone derivative forming part of the working solution is preferably chosen from 2-alkyl-9,10-anthraquinones in which the alkyl substituent contains from 1 to 5 carbon atoms, such as methyl, ethyl, sec-butyl, tert-butyl, tert-amyl and isoamyl radicals, and the corresponding 5,6,7,8-tetrahydro derivatives, or from 9,10-dialkylanthraquinones in which the alkyl substituents, which are identical or different, contain from 1 to 5 carbon atoms, such as methyl, ethyl and tert-butyl radicals, for example 1,3-dimethyl, 1,4-dimethyl, 2,7-dimethyl, 1,3-diethyl, 2,7-di(tert-butyl), 2-ethyl-6-(tert-butyl) and the corresponding 5,6,7,8-tetrahydro derivatives. The organic solvent forming part of the working solution is preferably a mixture of a nonpolar compound and of a polar compound. The nonpolar compound is preferably chosen from petroleum cuts of boiling point higher than 140° C., predominantly containing aromatic hydrocarbons containing at least 9 carbon atoms, such as trimethylbenzene isomers, tetramethylbenzene isomers, tert-butylbenzene, methylnaphthalene isomers and dimethylnaphthalene isomers. The nonpolar compound is preferably chosen from saturated alcohols preferably containing from 7 to 11 carbon atoms, such as diisobutylcarbinol, 3,5,5-trimethylhexanol, isoheptanol, carboxylic acid esters such as methylcyclohexyl acetate marketed under the name of "Sextate", heptyl acetate, butyl benzoate and ethyl heptanoate, phosphoric acid esters such as tributyl phosphate, tri-2-ethylbutyl phosphate, tri-2-ethylhexyl phosphate and tri-n-octyl phosphate and tetrasubsituted ureas such as tetra-n-butylurea.

"Hydrogen peroxide equivalent" is intended to mean the quantity of hydrogen peroxide, expressed in grams, which one liter of working solution is capable of supplying at the end of the oxidation stage if the yield of this stage in the oxidizer 2 is 100%. This potential mass concentration of peroxide corresponds to a molar concentration which is equal to the molar concentration of all of the reoxidized anthrahydroquinone forms in the working solution. It depends, on the one hand, on the concentration of the anthraquinone forms in the initial working solution and, on the other hand, on the hydrogenation conditions in 1.

In the present case the hydrogenation is performed at a temperature of between 50° and 70° C., with a pressure in the top gas space of the hydrogenator (a pressure which controls the hydrogen flow rate) of approximately 0.8 to 1.5 bars, and the hydrogen peroxide equivalent is controlled at a value approximately between 7 and 9 g/l by adjustment of the residence time in the hydrogena, at a given concentration of anthraquinone forms.

The reduced working solution drawn off from the hydrogenator is filtered in 6 to remove all trace of catalyst and is then cooled in 8 and then in 9 to a temperature of the order of 35°–40° C. The pressure in the top gas space of the oxidizer is maintained at a value of between 2 and 4 bars. The reduced working solution is thus oxidized in 2, the head fluid from the oxidizer being partly condensed in 10.

The hydrogen peroxide formed by the oxidization reaction is drawn from the base of the oxidizer in a quantity equal to the product of the above-mentioned hydrogen peroxide equivalent and of the oxidizer yield, as a mixture with the working solution which is oxidized anew. This liquid is conveyed directly via the line 12, by virtue of the driving pressure difference, to the base of the extractor 3, which operates slightly above atmospheric pressure. In the extractor a liquid-liquid extraction is performed by means of the demineralized water introduced at the top of the extractor.

A water-hydrogen peroxide solution is drawn from the base of the latter; its hydrogen peroxide concentration is adjusted to the value necessary for its direct use in the consumer plant 20. In the example being considered, where the plant 20 is a paper pulp bleaching plant, the hydrogen peroxide concentration chosen is lower than 15% by weight, for example between 5 and 12% by weight.

The working solution separated from the hydrogen peroxide is drawn from the top of the extractor 3, freed from the droplets of aqueous phase which it has entrained in the coalescer 14, is then conveyed by the pump 15 to the heat exchanger 8, in which it is reheated and, from there, is recycled to the base of the hydrogenator 1.

The oxidizer 2 comprises an outer casing containing an organized packing or simple perforated trays or trays of the distillation tray type, that is to say each having a liquid-holder, orifices for bubbling gas rising through this holder and descent means for the liquid from one tray to the next, or else a combination of an organized packing and of such trays.

If it exists, the organized packing is preferably of the so-called "corrugated-crisscross" type.

Figure 2:
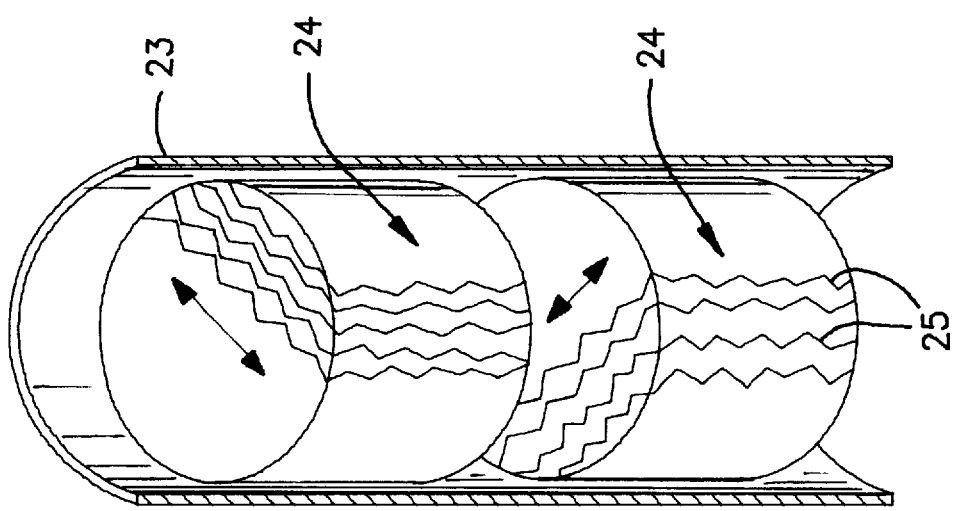
FIG. 2 shows diagrammatically in perspective the general arrangement of a portion of the oxidizer which is equipped with a corrugated-crisscross packing.

FIG. 2 illustrates the general arrangement of the common portion of the oxidizer containing such a packing. This common portion essentially includes a cylindrical shell 23 in which the packing unit components 24 of cylindrical overall shape are stacked.

Figure 3:
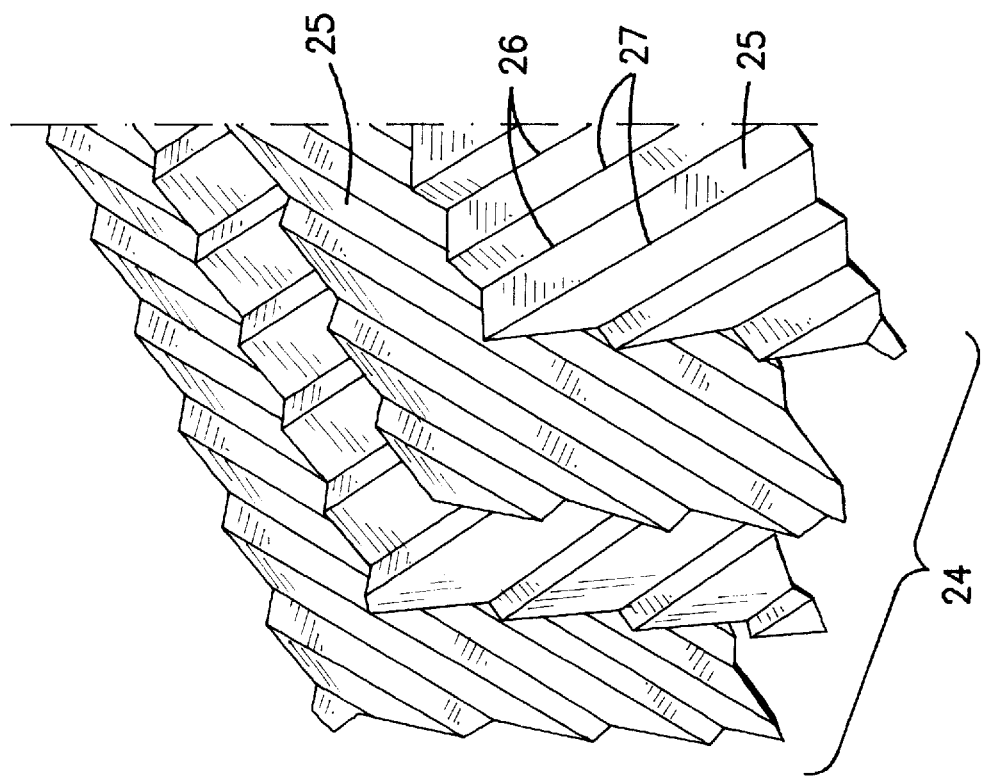
FIG. 3 shows in exploded perspective the constitution of a unit component of the packing of FIG. 2.

Each unit component 24, of the "corrugated-crisscross" type, includes a package of lamellae 25 which have a rectangular overall shape and are obliquely corrugated, the corrugations preferably having a triangular profile. The direction of inclination of the corrugations is reversed from one lamella to the next, as can be seen clearly in FIG. 3.

All the lamellae of the same unit component are arranged in parallel vertical planes and have the same height. On the other hand, their length, or horizontal dimension, increases from a minimum value in the case of an outermost lamella to a maximum value in the case of the middle lamella and again decreases to the same minimum value in the case of other outermost lamella. Thus, when all the lamellae rest against one another, a unit component 24 of cylindrical overall shape is obtained, the outline of which has been shown in FIG. 2.

On each face each lamella comprises corrugation tops 26 and corrugation hollows 27 defining a multitude of sloping channels.

The corrugation tops of one face of a lamella touch those of the opposing face of the adjacent lamella, forming a multitude of points of intersection; the latter promote the distribution and the contacting of the fluids. In addition, with the same objective, each unit component 24 is offset angularly by 90° in relation to the next, as can be seen in FIG. 2, and each lamella comprises a multitude of perforations, which are not shown.

Although such a "corrugated-crisscross" packing is relatively inefficient from the viewpoint of dispersion of the rising gas into fine bubbles, it is suitable in the process described, from the viewpoint of the gas-liquid exchange, and also from that of safety. In fact, since the oxidizer operates in a temperature range (approximately 35° to 40° C. at the top, approximately 45° to 50° C. at the base) which is clearly lower than the range of usual temperatures in plants for producing hydrogen peroxide which operate using the technique of autooxidation of an anthraquinone derivative, the risk of explosion in the oxidizer due to contact of oxygen with the solvent vapor is considerably reduced, even at the base of the oxidizer.

The essential advantage which results from the use of such a corrugated-crisscross packing lies in the fact it tends much less to retain the solid impurities than do the loose bulk packings (for example with Raschig rings) which are usually employed in the oxidizer. As a result, when restarting, there is much less risk of producing an abrupt entry into the extractor of a relatively large quantity of particles, especially metallic ones, which would be dangerous a this stage of the process.

The above comments also apply to the use of trays promoting the gas-liquid contact in the oxidizer 2.

It should furthermore be noted that, at the same efficiency, the "corrugated-crisscross" packings like the trays occupy a smaller volume than the loose bulk packings, and this enables the oxidizer to be reduced in dimensions. In addition, in the case of trays the reaction can be optimized at each level of the oxidizer through a judicious choice of the distances between the trays.

Furthermore, the relatively low temperature of oxidation provides, as another advantage, the possibility of employing enriched air, or even pure oxygen, in the oxidizer, in complete safety, in order to reduce the residence time of the solution in the oxidizer. In fact, when the residence time is shorter, the dimensions of the unit can be reduced further and the quantity of degraded products of the working solution is lowered.

I claim:

1. In a process for producing hydrogen peroxide by auto-oxidation of an anthraquinone derivative, which comprises:

provided a working solution containing at least one anthraquinone derivative in solution in at least one organic solvent;

subjecting the working solution to a catalytic hydrogenation stage in a hydrogenator to obtain a hydrogenated working solution;

filtering the hydrogenated working solution to obtain a filtered hydrogenated working solution;

subjecting the filtered hydrogenated working solution to an oxygenation stage in an oxidizer with an oxygen-containing fluid to obtain an oxidized working solution;

subjecting the oxidized working solution to a separation stage using water in an extractor to obtain a solution of hydrogen peroxide in water and a separated working solution; and recycling the separated working solution to the hydrogenator; the improvement wherein the hydrogenation stage is conducted so as to obtain at the entry of the oxidizer a hydrogen peroxide equivalent ranging between about 7 and about 9 g/l;

the oxidation stage is conducted at a temperature which, at the top of the oxidizer, is lower than approximately 50° C.;

the oxidizer includes a corrugated-crisscross packing;

the solution of hydrogen peroxide in water has a hydrogen peroxide concentration lower than 15% by weight; and the filtered hydrogenated working solution and the oxygen-containing fluid are fed to the oxidizer counter-currently.

2. Process according to claim 1, wherein the oxidation stage is conducted at a pressure, in an upper gas space of the oxidizer, of approximately between 1 and 10 bars.

3. Process according to claim 2, wherein the oxidation stage is conducted at a pressure ranging between 2 and 4 bars in the upper gas space of the oxidizer.

4. Process according to claim 1, wherein the hydrogenation stage is conducted at a temperature ranging between about 50° and 70° C.

5. Process according to claim 4, wherein the hydrogenation stage is conducted at a pressure, in an upper gas space of the hydrogenator, of approximately between 0.5 and 4 bars.

6. Process according to claim 5, wherein the hydrogenation stage is conducted at a pressure ranging between about 0.8 and 1.5 bars in the upper gas space of the hydrogenator.

7. Process according to claim 1, wherein the solution of hydrogen peroxide in water has a hydrogen peroxide concentration ranging between 5 and 12% by weight.

8. Process according to claim 1, wherein the oxidation stage is conducted at a temperature ranging between 25° and 40° C. at the top of the oxidizer.

* * * * *